(12) United States Patent
Danteny et al.

(10) Patent No.: US 11,814,967 B2
(45) Date of Patent: Nov. 14, 2023

(54) COOLING DEVICE FOR A TURBOMACHINE CASING

(71) Applicant: SAFRAN AIRCRAFT ENGINES, Paris (FR)

(72) Inventors: Ulysse Jacques Bernard Danteny, Moissy-Cramayel (FR); Laurent Cédric Zamai, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 70 days.

(21) Appl. No.: 17/617,692

(22) PCT Filed: Jun. 11, 2020

(86) PCT No.: PCT/FR2020/050999
§ 371 (c)(1),
(2) Date: Dec. 9, 2021

(87) PCT Pub. No.: WO2020/249908
PCT Pub. Date: Dec. 17, 2020

(65) Prior Publication Data
US 2022/0243605 A1 Aug. 4, 2022

(30) Foreign Application Priority Data

Jun. 12, 2019 (FR) ...................................... 1906225

(51) Int. Cl.
*F01D 11/24* (2006.01)
*F01D 25/12* (2006.01)
(Continued)

(52) U.S. Cl.
CPC .............. *F01D 11/24* (2013.01); *F01D 25/12* (2013.01); *F01D 25/14* (2013.01); *F02C 3/067* (2013.01);
(Continued)

(58) Field of Classification Search
CPC .......... F01D 11/24; F01D 11/20; F02K 3/072; F02C 3/067; F05D 2250/44
See application file for complete search history.

(56) References Cited

U.S. PATENT DOCUMENTS 5,027,604 A * 7/1991 Krueger .................. F01D 5/187
60/753
10,077,677 B2 9/2018 Prestel et al.
(Continued)

FOREIGN PATENT DOCUMENTS

FR 2 955 890 A1 8/2011
FR 3 021 700 A1 12/2015

OTHER PUBLICATIONS

International Search Report dated Oct. 9, 2020, issued in corresponding International Application No. PCT/FR2020/050999, filed Jun. 11, 2020, 5 pages.
(Continued)

*Primary Examiner* — Gerald L Sung
(74) *Attorney, Agent, or Firm* — CHRISTENSEN O'CONNOR JOHNSON KINDNESS PLLC

(57) ABSTRACT

A turbine for a turbomachine has a first rotor and a second rotor configured to pivot about an axis in two opposite directions of rotation. The first rotor includes a radially outer drum from which blades extend radially inwards. The turbine has cooling means attached relative to the outer drum. The cooling means include a support plate with at least one first orifice and a calibration plate that is attached to the support plate and located radially inside the support plate. The calibration plate has at least one second calibration orifice facing the outer drum to allow the passage of cooling air radially from the outside to the inside through the first and second orifices.

10 Claims, 4 Drawing Sheets

(51) Int. Cl.
F01D 25/14 (2006.01)
F02C 3/067 (2006.01)
F02C 7/18 (2006.01)

(52) U.S. Cl.
CPC .......... *F02C 7/18* (2013.01); *F05D 2250/182* (2013.01); *F05D 2250/44* (2013.01); *F05D 2260/201* (2013.01)

(56) References Cited

U.S. PATENT DOCUMENTS

| | | | |
|---|---|---|---|
| 2004/0086377 A1* | 5/2004 | Proctor | F01D 1/26 415/173.5 |
| 2013/0219856 A1 | 8/2013 | Suciu et al. | |
| 2019/0085710 A1 | 3/2019 | van der Merwe et al. | |

OTHER PUBLICATIONS

Written Opinion dated Oct. 9, 2020, issued in corresponding International Application No. PCT/FR2020/050999, filed Jun. 11, 2020, 5 pages.
English translation of Written Opinion dated Oct. 9, 2020, issued in corresponding International Application No. PCT/FR2020/050999 filed Jun. 11, 2020, 5 pages.
International Preliminary Report on Patentability dated Dec. 14, 2021, issued in corresponding International Application No. PCT/FR2020/050999, filed Jun. 11, 2020, 6 pages.

* cited by examiner

COOLING DEVICE FOR A TURBOMACHINE CASING

FIELD OF THE DISCLOSURE

The present disclosure relates to a device for cooling a turbomachine casing, such as for instance a double-flow turbomachine.

BACKGROUND

FIG. 1 shows a double-flow, twin-engine turbomachine 1. The axis of the turbomachine is referenced X and corresponds to the axis of rotation of the rotating parts. In the following, the terms "axial" and "radial" are defined in relation to the X axis.

The turbomachine 1 has, from upstream to downstream in the direction of gas flow, a fan 2, a low-pressure compressor 3, a high-pressure compressor 4, a combustion chamber 5, a high-pressure turbine 6 and a low-pressure turbine 7.

The air from the fan 2 is divided into a primary flow 8 flowing into a primary annular vein 9, and a secondary flow 10 flowing into a secondary annular vein 11 surrounding the primary annular vein 10.

The low-pressure compressor 3, the high-pressure compressor 4, the combustion chamber 5, the high-pressure turbine 6 and the low-pressure turbine 7 are located in the primary vein 9. The rotor of the high-pressure turbine 6 and the rotor of the high-pressure compressor 4 are coupled in rotation via a first shaft 12 in order to form a high-pressure body.

The rotor of the low-pressure turbine 7 and the rotor of the low-pressure compressor 3 are coupled in rotation via a second shaft 13 in order to form a low-pressure body, the fan 2 being able to be connected directly to the rotor of the low-pressure compressor 3 or via an epicyclic gear train for example.

As is best seen in FIG. 2, the low-pressure turbine 7 comprises in particular different successive stages with impellers 14 and stationary parts. The impeller has a disc 15 on which blades 16 are mounted. The ends of the blades 16 are surrounded by an attached ring 17 made of abradable material, the ring 17 being attached on the turbine casing 18. Valves 19 are located downstream of the impellers 14. The valves 19 and rings 17 are mounted to the casing via flanges or hooks 20 extending from the radially inner surface of the casing 18.

In order to guarantee a high efficiency for the turbomachine, the air flow not passing through the impellers 14 of the individual stages must be limited, i.e. leaks between the radially outer ends of the blades 16 and the ring 17 made of abradable material must be limited. To do this, the clearance must be checked at this interface, as this clearance is dependent on the temperature of the casing 18, and in particular on the areas of the casing 18 containing the hooks or the flanges 20 supporting the ring 17.

The primary air flow from the combustion chamber 5 is hot and heats the downstream parts, such as the stationary and mobile parts of the turbine 6, 7.

In order to control the above-mentioned clearance and to avoid any premature degradation of the various stationary and mobile parts of the turbine, it is necessary to provide effective cooling means that can be easily integrated into the environment of the turbomachine.

The patent application FR 3 021 700, in the name of the Applicant, discloses a cooling device 21 for a casing 18 of a low-pressure turbine 7, visible in FIG. 3, comprising manifold housings 22 attached to a stationary casing of the turbomachine, each manifold housing 22 forming an axially extending channel.

The device 21 further comprises tubes 23, also called ramps, extending circumferentially on either side of the manifold housings 22. Each tube 23 has an air inlet opening into the channel of the manifold housing 22 and air ejection orifices facing the casing 18, so that cooling air can enter the manifold housings 22 and then the tubes 23 before exiting through the orifices facing the casing 18, thereby cooling it. This is known as impact cooling because the air impacts the casing 18. Such a device is known as LPTACC (Low Pressure Turbine Active Clearance Control).

Recent developments have led to the development of so-called counter-rotating turbines. Such a turbine comprises a first rotor comprising one or more stages formed by bladed wheels, rotating around the X axis of the turbomachine in a first direction of rotation, and a second rotor comprising one or more stages formed by bladed wheels, rotating around the X axis in a second direction of rotation, opposite to the first direction of rotation.

The first rotor has a radially outer drum, from which blades extend radially inwards. The second rotor has a radially inner drum, from which blades extend radially outwards.

The rotors, in particular the radially outer drum of the first rotor, must be cooled.

It turns out that it is not appropriate to use a cooling device of the type LPTACC as described above. Indeed, the use of stationary ramps to impact-cool a rotating drum is not efficient because, during the rotation of the drum, a boundary layer of air surrounds the drum, the air flow coming from the ramps' orifices being sheared by the rotation of the drum and by the boundary layer, strongly reducing the cooling efficiency.

The disclosure thus aims to meet the cooling requirements of a counter-rotating turbine.

SUMMARY

To this end, the disclosure concerns a turbine for a turbomachine comprising a first rotor and a second rotor configured to pivoting about an axis in two opposite directions of rotation, the first rotor comprising a radially outer drum from which blades extend radially inwards, characterised in that it comprises cooling means stationary with respect to the outer drum, the cooling means comprising a support plate comprising at least one first orifice and a calibration plate attached to the support plate and located radially inside the support plate, the calibration plate comprising at least one second calibration orifice facing the outer drum so as to allow the passage of cooling air radially from the outside to the inside through the first and second orifices.

In this way, air from, for example, the high-pressure compressor can be supplied to an annular air inlet space located radially outside the support plate and then pass radially from the outside inwards through the support plate and the calibration plate, through the first orifice and the second orifice respectively, before impact-cooling the outer drum of the first rotor. Since the cooling means are stationary with respect to the first rotor, the air impacting the outer drum of the first rotor is not sheared off by the rotation of the first rotor as in the prior art, thus ensuring efficient cooling.

The terms "axial", "radial" and "circumferential" are defined in relation to the axis of rotation, which is the axis of the turbine.

The air inlet annular space can be defined between a stationary casing and the support plate.

The total cross-sectional area of the first orifice(s) can be greater than the total cross-sectional area of the second orifice(s).

In other words, the airflow is limited not by the cross-section of the first orifices, but by the cross-section of the second orifices.

The calibration plate can delimit, with the support plate, at least one intermediate chamber into which the first and second orifices open.

The intermediate chamber forms a plenum. For each intermediate chamber, the total cross-section of the first orifice(s) opening into the intermediate chamber is greater than the total cross-section of the second orifice(s) opening into the same intermediate chamber.

The turbine can comprise several intermediate chambers, the different intermediate chambers do not communicate directly with each other and are independent of each other. The individual intermediate chambers can be circumferentially and/or axially offset. Several intermediate chambers can be delimited by the same calibration plate.

The intermediate chamber can have a generally trapezoidal cross-section and the calibration sheet can be welded or soldered to the support plate.

The intermediate chamber can be gas-tight, except for the first and second orifices.

The turbine can have at least two calibration plates that are axially offset from each other and attached to the support plate.

Each calibration plate can delimit one or more intermediate chambers.

The outer drum can comprise through-orifices opening opposite the blades of the first rotor. In this way, the air that has impacted the outer drum is then directed, at least in part, opposite the blades of the first rotor, for example opposite the radially outer platforms of the blades, through the orifices in the outer drum, so as to ensure cooling of the blades. The air flowing through these orifices also allows the outer drum to be cooled more, in particular, than with a simple jet impact.

The downstream end and/or the upstream end of the support plate can be screwed or riveted to the outer drum.

The downstream end of the support plate can have a radial rim, attached to a radial rim of the drum.

The radial rim can extend radially inwards or radially outwards from the corresponding end of the support plate.

The upstream end and/or the downstream end of the support plate is held radially with respect to the outer drum, the end being able to translate axially with respect to the outer drum.

Such a translation allows for possible displacements during operation, especially in the case of differential axial expansions between the support plate and the outer drum.

The end of the support plate can be held by means of a holding member attached to the outer drum, the holding member having a radial attachment part and an axial holding part, the end of the support plate being radially mounted in a space between the outer drum and the holding part.

A seal or elastic member can be mounted axially between the fixing part of the holding member and the corresponding axial end of the support plate.

The second rotor can comprise a radially inner drum from which blades extend radially outwards.

At least one of the rotors can comprise a number of turbine stages, each stage being formed by a bladed wheel comprising a plurality of circumferentially distributed blades.

The disclosure also concerns a turbomachine, characterised in that it comprises at least one turbine of the aforementioned type.

The turbomachine can comprise, from upstream to downstream in the direction of gas flow within the turbomachine, a fan, a low-pressure compressor, a high-pressure compressor, a combustion chamber, a high-pressure turbine and a low-pressure turbine, the low-pressure turbine being a turbine according to the disclosure.

The turbomachine can comprise means for supplying a flow of cooling air to the low-pressure turbine, the flow of cooling air being taken from the high-pressure compressor and being supplied to an annular space located radially outside the support plate.

In this way, the pressure of the cooling air is higher than the temperature of the gases in the low-pressure turbine. The vein is delimited between the drums of the first and second rotors. This prevents hot gases from the vein from flowing back out of the vein through the orifices in the calibration and support plates.

DETAILED DESCRIPTION

Figure 1:
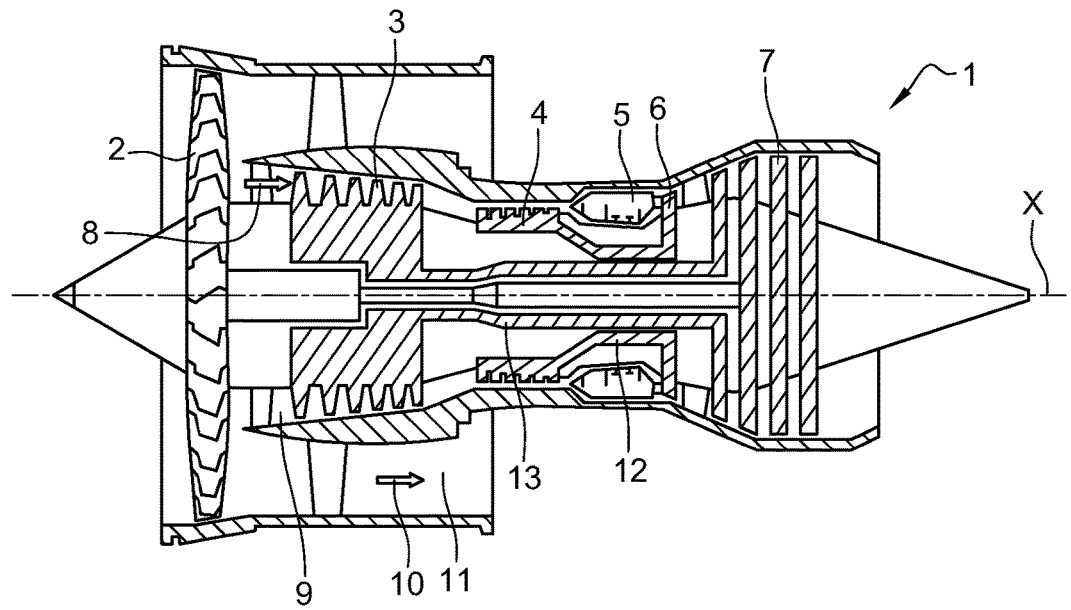
FIG. 1 is a schematic view in axial section of a turbomachine of the prior art.
Figure 2:
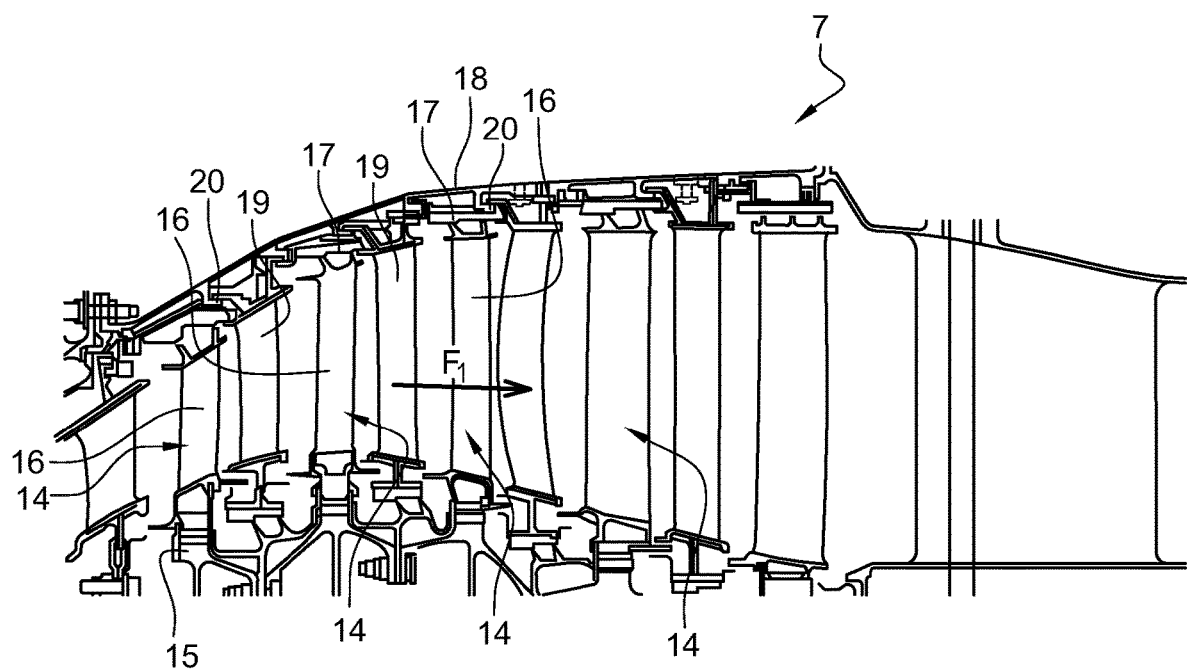
FIG. 2 is a half-view in axial section of a turbine of the prior art.
Figure 3:
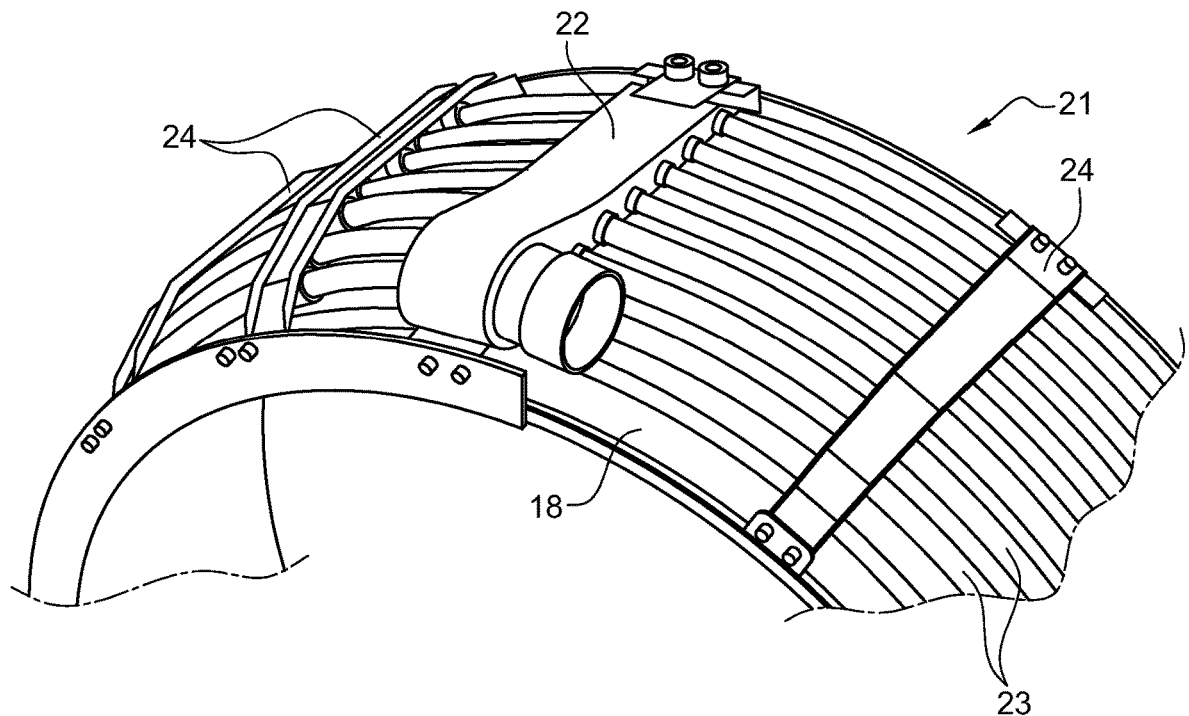
FIG. 3 is a perspective view of a cooling device of the prior art.
Figure 4:
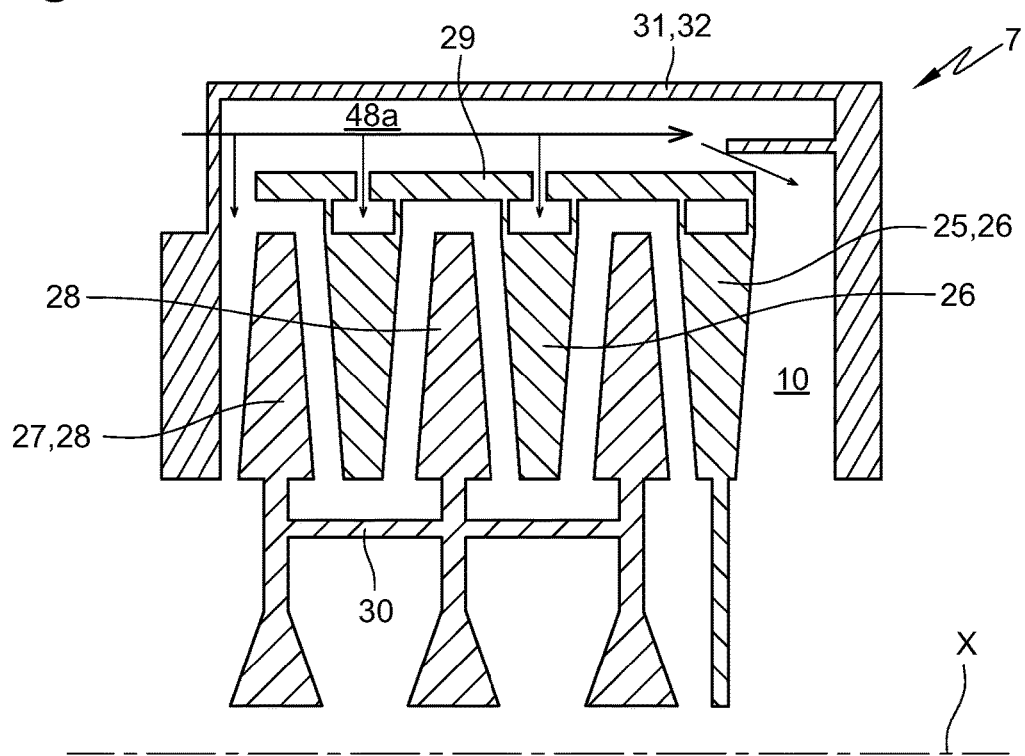
FIG. 4 is a schematic half-view of a counter-rotating low-pressure turbine.
Figure 5:
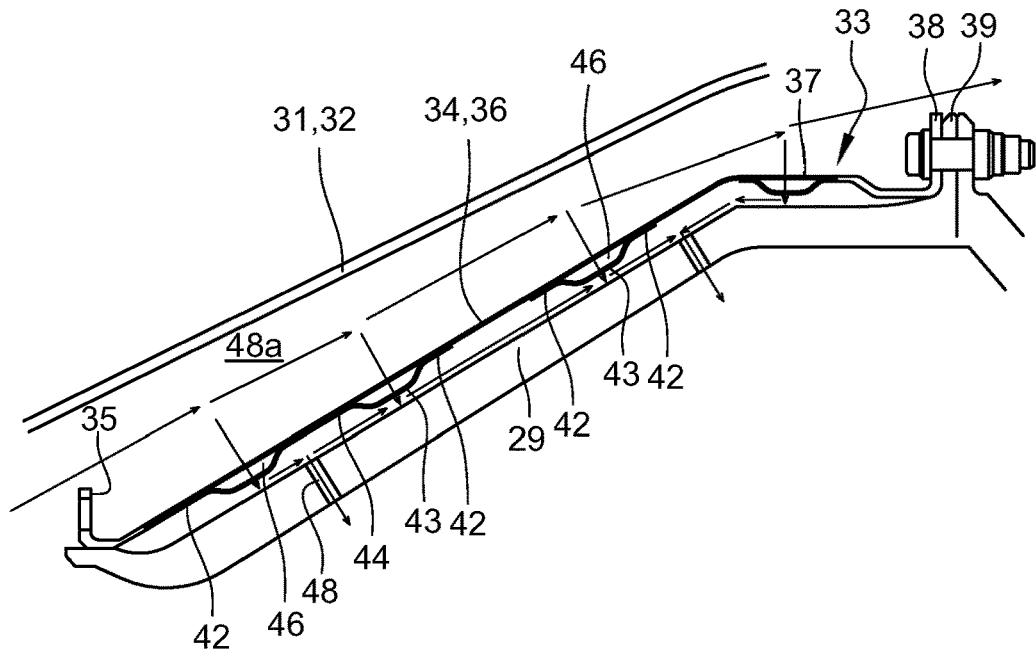
FIG. 5 is a view in axial section of part of a turbine according to a first embodiment of the disclosure.
Figure 6:
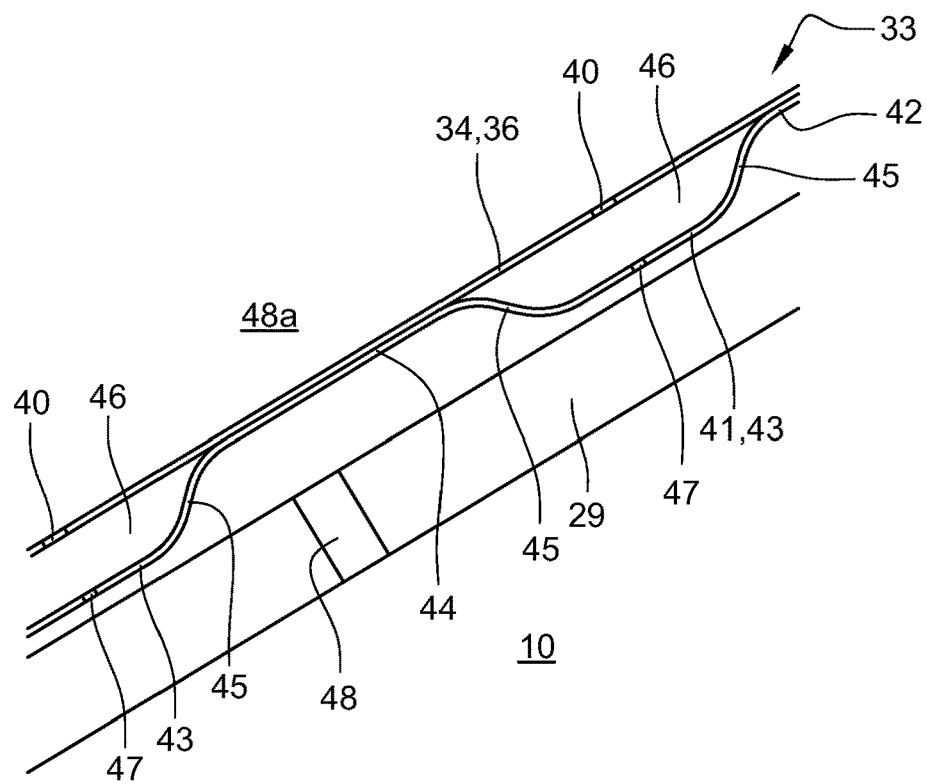
FIG. 6 is a detailed view of part of FIG. 5.

FIGS. 4 to 6 illustrate a low-pressure turbine 7 of a turbomachine according to a first embodiment of the disclosure.

The turbine 7 is of the counter-rotating type and comprises a first rotor 25 comprising one or more stages formed by bladed wheels 26, rotating about the X axis of the turbine 7 in a first direction of rotation, and a second rotor 27 with one or more stages 28 formed by bladed wheels, rotating about the X axis in a second direction of rotation, opposite to the first direction of rotation.

The first rotor 25 has a radially outer drum 29, from which blades 26 extend radially inwards. The second rotor 27 has a radially inner drum 30, from which blades 28 extend radially outwards.

The rotors 25, 27 are housed in a stationary casing 31, the casing 31 comprising in particular a radially outer annular wall 32.

As mentioned above, the rotors 25, 27, in particular the radially outer drum 29 of the first rotor 25, must be cooled. To this end, the turbine 7 comprises cooling means 33 stationary with respect to the outer drum 29, the cooling means 33 comprising an annular support plate 34.

The support plate 34 is annular and has, from upstream to downstream, a radial rim 35, a frustoconical part 36 flaring downstream, a cylindrical part 37 and a radial rim 38.

The flanges 35, 38 form the upstream and downstream ends of the support plate 34 and extend radially outwards from the frustoconical part 36 and from the cylindrical part 37.

Each flange 35, 38 is attached to a radial rim 39 of the outer drum 29 or a part connected to the first rotor 25.

The support plate 34 has first orifices 40 distributed in rows axially offset from each other. The first orifices 40 in a row are evenly distributed around the circumference of the support plate 34. The first orifices 40 each have a circular cross-section. The axes of the first orifices 40 are perpendicular to their implantation zone in the frustoconical part 36 or in the cylindrical part 37 of the support plate 34.

The cooling means 33 also comprise calibration plates 41 attached to the support plate 34. The calibration plates 41 are annular and are axially offset from each other. Each calibration plate 41 has two axial ends 42 which are sealingly attached, for example by welding or soldering, to the support plate 34, and at least one middle part 43 which is spaced radially inwards from the support plate 34. The middle part 43 is frustoconical or cylindrical, and coaxial with the frustoconical 36 or cylindrical part 37 of the support plate 34 to which it is attached. The calibration plate 41 can have one or more separate middle sections 43, spaced axially apart from each other, and spaced from the support plate 34. In this case, two middle parts are separated by an attachment part 44 which is welded or soldered to the support plate 34. Each middle area 43 is connected to the ends 42 or to the attachment part 44 by connecting areas 45 (FIG. 6). The distance between the middle area 43 and the radially outer face of the outer drum 29 can be between 1 and 10 mm.

Each calibration plate 41 is annular and thus defines one or more annular intermediate or stilling spaces 46 with the support plate 34, the intermediate spaces 46 having a generally trapezoidal cross-section. Each intermediate space is delimited by the support plate 34, the middle part 43 and the corresponding connecting parts 45.

Second orifices 47 are provided in each middle area 43 of each calibration plate 41. The second orifices 47 are arranged in at least one row. The second orifices 47 within a row are evenly distributed around the circumference of the calibration plate 41. The second orifices 47 each have a circular cross-section.

The diameter of the second orifices 47 is smaller than the diameter of the first orifices 40. The diameter of the first orifices 40 is for example between 0.1 and 10 mm. The diameter of the second orifices 47 is for example between 0.1 and 10 mm.

The axes of the second orifices 47 are perpendicular to the area where they are located in the frustoconical or cylindrical central part 43 of the corresponding calibration plate 41. The second orifices 47 can be located opposite the corresponding first orifices 40. Each second orifice 47 can be coaxial with a first orifice 40.

The outer drum 29 also has third through-orifices 48, which connect the annular space 48 between firstly, the casing 31 and the support plate 34, on the one hand, and secondly, the space radially inside the outer drum 29 forming the primary vein 10. The third orifices 48 are located opposite the radially outer platforms of the blades 26 of the first rotor 25, the blades 26 not being shown in FIGS. 5 to 8.

In operation, cooling air is taken from the high-pressure compressor 4 of the turbomachine 1 and fed into the annular space 48 between the casing 31 and the support plate 34. This cooling air is at a higher pressure than the gas pressure within the turbine 7.

As illustrated by the arrows in FIG. 5, this air then passes through the first orifices 40, the intermediate chambers 46 and the second orifices 47 in succession before impacting the radially outer surface of the outer drum 29, thereby cooling it. This cooling air then passes through the third orifices 48 to cool the blades 26, before being discharged into the turbine 7 vein 10.

Figure 7:
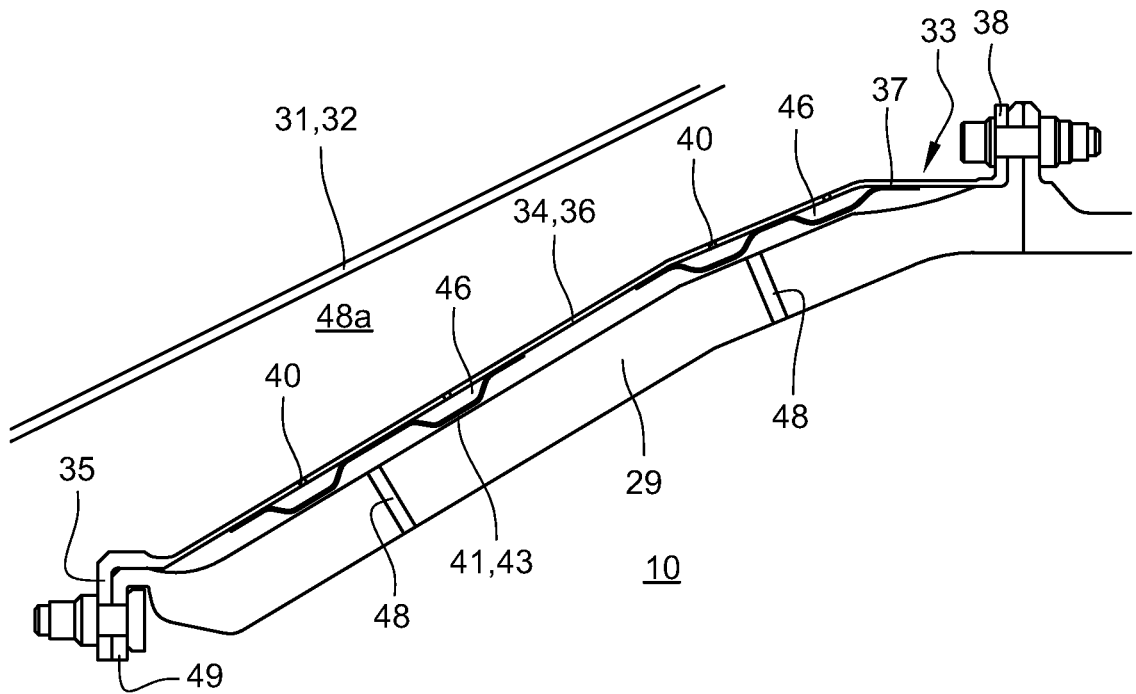
FIG. 7 is a view corresponding to FIG. 5, illustrating a second embodiment of the disclosure.

FIG. 7 illustrates a second embodiment of the disclosure, which differs from that set out with reference to FIGS. 4 to 6 in that the radial rim 35 of the upstream end of the support plate 34 extends radially inwardly from the frustoconical part 36 and is threadedly attached to a radial rim 49 of the outer drum 29.

Figure 8:
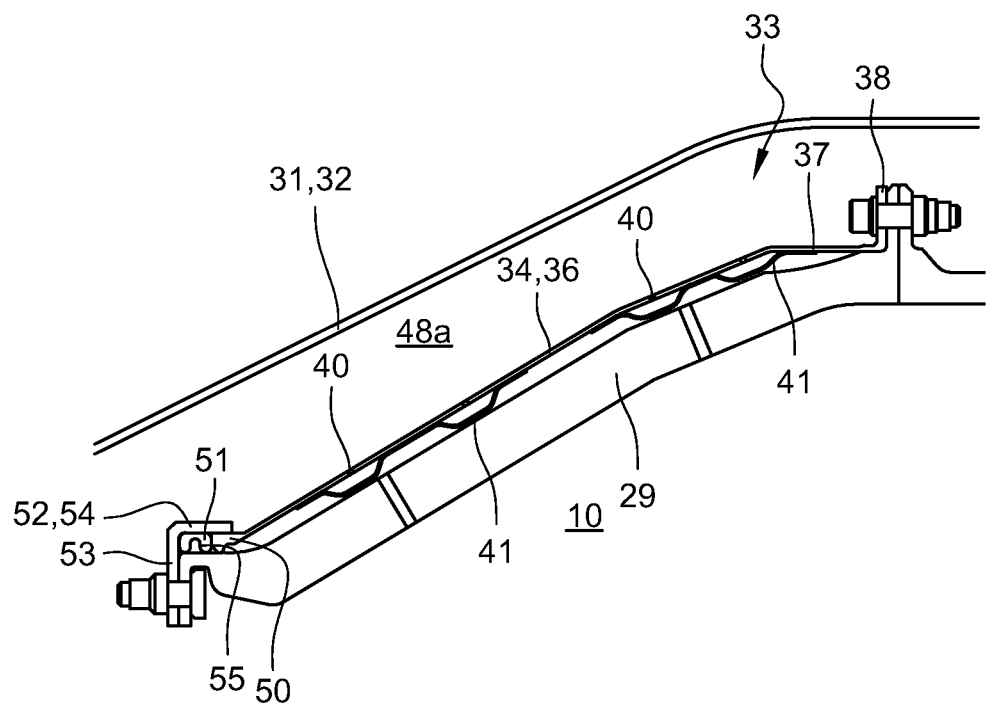
FIG. 8 is a view corresponding to FIG. 5, illustrating a third embodiment of the disclosure.

FIG. 8 illustrates a third embodiment of the disclosure, which differs from that set out with reference to FIG. 7 in that the upstream end 50 of the support plate 34 extends axially and is engaged in an axially extending annular space 51 provided between a holding member 52 and the upstream end of the outer drum 29.

The holding member 52 is annular. It has an L-shaped cross-section and comprises a radial attachment part 53 and an axial holding part 54. The annular space 51 is defined between the holding part 54 and the outer drum 29.

The upstream end 50 of the support plate 34 is thus held radially with little or no radial clearance in the aforementioned annular space 51, an axial displacement being possible between the upstream end 50 of the support plate 34 and the outer drum 29, so as to compensate in particular for any phenomena of differential expansion during operation. The axial movement is guided by a plane-on-plane contact between the outer surface of the upstream end 50 and the inner surface of the holding part 54.

A seal or elastic member 55 can be mounted axially between the attachment part 53 of the holding member 52 and the upstream axial end 50 of the support plate 34. This seal or elastic member is for example formed by a corrugated sheet.

The invention claimed is:

1. A turbine for a turbomachine comprising a first rotor and a second rotor configured to pivot about an axis (X) in two opposite directions of rotation, the first rotor comprising a radially outer drum from which blades extend radially inwards, the turbine comprising cooling means attached with respect to the outer drum, said cooling means comprising a support plate comprising at least one first orifice, the cooling means further comprising at least one calibration plate attached to the support plate and located radially inside the support plate, the at least one calibration plate comprising at least one second calibration orifice turned towards the outer drum to allow passage of cooling air radially from the outside to the inside through the at least one first orifice and the at least one second orifice.

2. The turbine according to claim 1, wherein a total cross-sectional area of the at least one first orifice is greater than a total cross-sectional area of the at least one second orifice.

3. The turbine according to claim 1, wherein at least one of the at least one calibration plate delimits with the support plate at least one intermediate chamber into which the at least one first orifice and the at least one second orifice open.

4. The turbine according to claim 3, wherein at least one of the at least one intermediate chamber has a trapezoidal cross-section.

5. The turbine according to claim 4, wherein each of the at least one calibration plate has a central area and fixing areas attached to the support plate on either side of the central area, the central area being spaced radially inwards from the support plate.

6. The turbine according to claim 1, the at least one calibration plate comprising a plurality of calibration plates axially offset from each other and attached to the support plate.

7. The turbine according to claim 1, wherein the outer drum comprises through orifices opening out opposite the blades of the first rotor.

8. The turbine according to claim 1, wherein at least one of a downstream end and an upstream end of the support plate is attached by screwing or riveting to the outer drum.

9. The turbine according to claim 1, wherein at least one of an upstream end and a downstream end of the support plate is held radially with respect to the outer drum, the at least one of an upstream end and a downstream end being configured to translate axially with respect to the outer drum.

10. A turbomachine comprising the turbine according to claim 1.

* * * * *